United States Patent
Okkelberg et al.

(10) Patent No.: US 12,525,988 B2
(45) Date of Patent: Jan. 13, 2026

(54) RADIO WAVE SIGNAL RECEIVER USING CONVOLUTIONAL NEURAL NETWORK TECHNOLOGY TO IMPROVE SIGNAL TO NOISE RATIO

(71) Applicant: The Boeing Company, Arlington, VA (US)

(72) Inventors: Klaus Zhang Okkelberg, Torrance, CA (US); Chrysanthie Diane Chamis, Palos Verdes Peninsula, CA (US)

(73) Assignee: The Boeing Company, Arlington, VA (US)

( * ) Notice: Subject to any disclaimer, the term of this patent is extended or adjusted under 35 U.S.C. 154(b) by 156 days.

(21) Appl. No.: 18/484,511

(22) Filed: Oct. 11, 2023

(65) Prior Publication Data

US 2025/0125813 A1 Apr. 17, 2025

(51) Int. Cl.
  *H03M 1/12* (2006.01)
  *H03M 1/08* (2006.01)

(52) U.S. Cl.
  CPC .......... *H03M 1/1245* (2013.01); *H03M 1/08* (2013.01)

(58) Field of Classification Search
  CPC .............................. H03M 1/1245; H03M 1/08
  USPC ....................................................... 341/155
  See application file for complete search history.

(56) References Cited

U.S. PATENT DOCUMENTS

| | | | |
|---|---|---|---|
| 9,378,733 B1 * | 6/2016 | Vanhoucke | G10L 15/08 |
| 9,640,186 B2 * | 5/2017 | Fousek | G10L 19/02 |
| 10,540,988 B2 * | 1/2020 | Lim | G06N 3/045 |
| 10,706,857 B1 * | 7/2020 | Ramasubramanian | G10L 17/10 |
| 10,747,231 B2 * | 8/2020 | Akotkar | G10L 25/30 |
| 11,997,728 B1 * | 5/2024 | Jagannath | H04W 76/11 |
| 2005/0091050 A1 * | 4/2005 | Surendran | G10L 25/78 704/226 |
| 2006/0082484 A1 * | 4/2006 | Linder | H03M 1/007 341/155 |
| 2015/0155878 A1 * | 6/2015 | Macleod | H03M 1/1245 341/122 |
| 2019/0287550 A1 * | 9/2019 | Lim | G06N 3/08 |
| 2020/0143279 A1 * | 5/2020 | West | H04B 17/309 |
| 2020/0160878 A1 * | 5/2020 | Heo | G10L 25/30 |
| 2020/0213728 A1 * | 7/2020 | Lopatka | G01S 3/8083 |
| 2020/0302949 A1 * | 9/2020 | Jeong | G06N 3/045 |
| 2021/0110582 A1 * | 4/2021 | Sornes | G06N 3/084 |
| 2022/0198824 A1 * | 6/2022 | Niaf | G06V 10/82 |
| 2023/0188176 A1 * | 6/2023 | Kim | G06V 10/454 375/130 |
| 2024/0378445 A1 * | 11/2024 | Wakayama | G06N 3/048 |

* cited by examiner

*Primary Examiner* — Zhen Y Wu

(74) *Attorney, Agent, or Firm* — Harrity & Harrity, LLP

(57) ABSTRACT

Systems, apparatuses and methods can provide for technology to perform a discrete cosine transform (DCT) on a first digital signal to obtain a frequency domain signal, wherein the frequency domain signal contains energy in a plurality of frequency bins, apply convolutional neural network (CNN) operations on the frequency domain signal, and output a probability for each of the plurality of frequency bins in accordance with the CNN operations, wherein each probability indicates whether the energy in a corresponding frequency bin contains a transmitted signal.

20 Claims, 14 Drawing Sheets

RADIO WAVE SIGNAL RECEIVER USING CONVOLUTIONAL NEURAL NETWORK TECHNOLOGY TO IMPROVE SIGNAL TO NOISE RATIO

TECHNICAL FIELD

The technology described herein generally relate to radio wave signal processing. More particularly, examples relate to a radio wave signal receiver that uses convolutional neural network (CNN) technology to improve signal to noise (SNR) ratio.

BACKGROUND

Improving signal to noise ratio (SNR) for multiple radio frequency (RF) signals having large instantaneous bandwidths may involve channelizing the received signal into sub-bands and splitting bandwidth into smaller frequency chunks for processing. Such an approach is typically unable to process signals that are wider than the sub-band. Other solutions may use larger physical antennas to collect the RF signals. Large antennas, however, require more size, weight and power (SWaP). Additionally, conventional platforms may lack sufficient working memory or cache to process the data quickly enough for real-time performance.

SUMMARY

In accordance with one or more examples, a performance-enhanced computing system comprises an analog to digital converter to convert a waveform to a first digital signal and a processor including logic coupled to one or more substrates, the logic to perform a discrete cosine transform (DCT) on the first digital signal to obtain a frequency domain signal, wherein the frequency domain signal contains energy in a plurality of frequency bins, apply convolutional neural network (CNN) operations on the frequency domain signal, output a probability for each of the plurality of frequency bins, wherein each probability indicates whether the energy in a corresponding frequency bin contains a transmitted signal, identify one or more noisy frequency bins in the plurality of frequency bins, wherein the noisy frequency bins are associated with probabilities that are below a threshold, suppress the energy in the noisy frequency bins, and perform an inverse DCT on the frequency domain signal to obtain a second digital signal, wherein the second digital signal is to include energy that comprises the transmitted signal and the suppressed energy.

In accordance with one or more examples, a semiconductor apparatus comprises one or more substrates and logic coupled to the one or more substrates, wherein the logic is implemented at least partly in one or more of configurable or fixed-functionality hardware, the logic to perform a discrete cosine transform (DCT) on a first digital signal to obtain a frequency domain signal, wherein the frequency domain signal contains energy in a plurality of frequency bins, apply convolutional neural network (CNN) operations on the frequency domain signal, and output a probability for each of the plurality of frequency bins in accordance with the CNN operations, wherein each probability indicates whether the energy in a corresponding frequency bin contains a transmitted signal.

In accordance with one or more examples, at least one computer readable storage medium comprises a set of instructions, which when executed by a computing system, cause the computing system to perform a discrete cosine transform (DCT) on a first digital signal to obtain a frequency domain signal, wherein the frequency domain signal contains energy in a plurality of frequency bins, apply convolutional neural network (CNN) operations on the frequency domain signal, and output a probability for each of the plurality of frequency bins in accordance with the CNN operations, wherein each probability indicates whether the energy in a corresponding frequency bin contains a transmitted signal.

BRIEF DESCRIPTION OF THE DRAWINGS

The various advantages of the examples will become apparent to one skilled in the art by reading the following specification and appended claims, and by referencing the following drawings, in which:

DESCRIPTION OF EMBODIMENTS

The technology described herein includes a radio wave signal receiver that uses a convolutional neural network (CNN) to reduce noise in near real-time. The receiver can include an interface to receive electromagnetic spectrum instantaneous bandwidth (IBW) energy containing time-domain signals, components to convert the IBW energy to the digital domain and a processor that ingests the digitized spectrum and outputs IBW energy with enhanced signal energy and reduced noise energy in near-real time. In the technology described herein, the processor combines a Discrete Cosign Transform (DCT), CNN and Inverse DCT, that suppresses the noise in the system channel around received signals in the instantaneous bandwidth. The noise reduction processor outputs an instantaneous bandwidth containing radio frequency (RF) signals and a reduced noise floor enabling downstream computations to detect low power signals with higher probability while at the same time increasing the amount of bandwidth that can be analyzed at once. When the noise reduction algorithm is implemented on processing platforms with central processing units (CPUs, e.g., host processors), field programmable gate arrays (FPGAs) and artificial intelligence (AI) accelerators, noise reduction processing can be conducted in near real time.

In one example, a processor and system to improve RF signal receiver sensitivity in near real-time, include an interface to receive analog time-domain signals and convert the analog time-domain signals to the digital domain. Additionally, the processor can use a DCT, CNN and Inverse DCT, that together suppress the noise energy in a wide instantaneous bandwidth around signals in near real-time. As a result, the probability of detecting low power signals in electromagnetic spectrum noise is improved.

Figure 1:
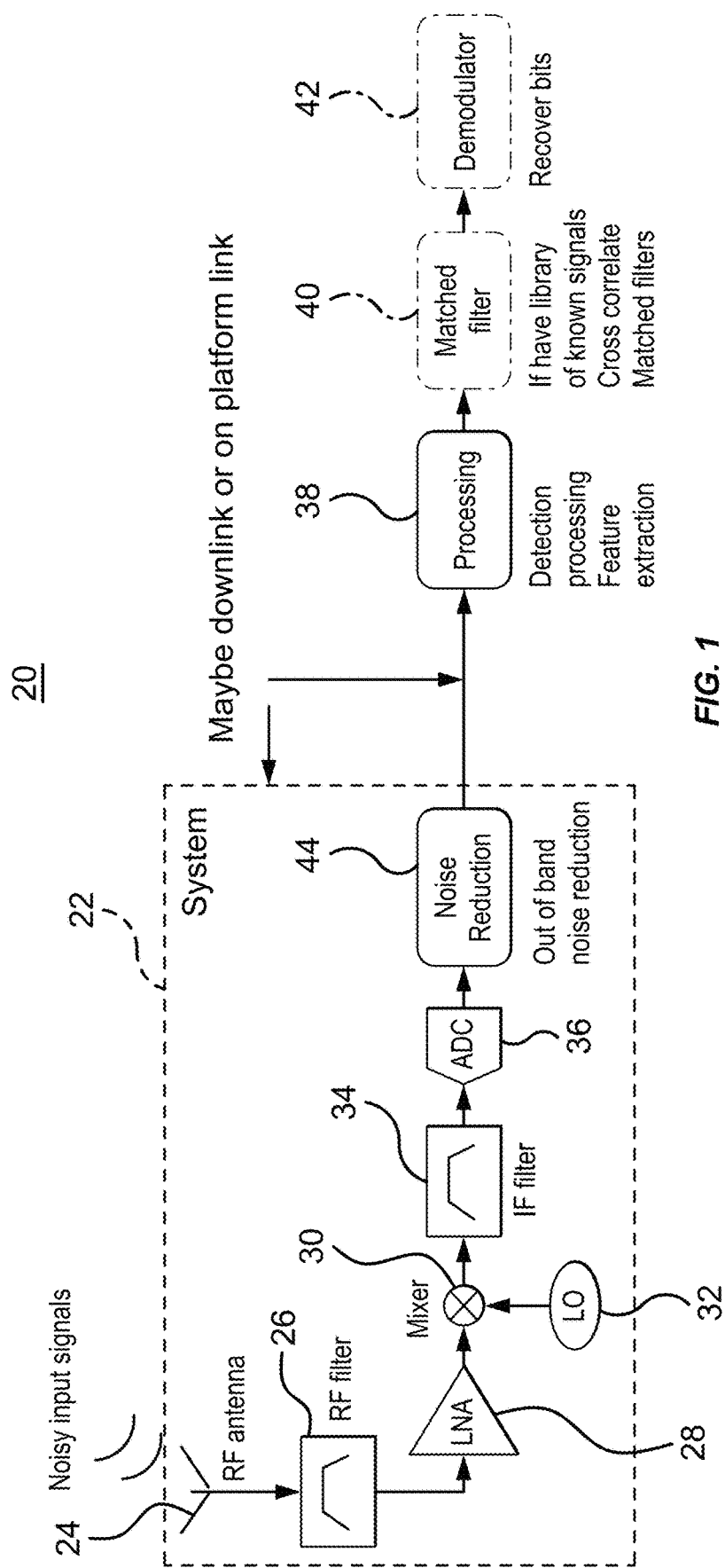
FIG. 1 is a block diagram of an example of a receive chain according to the technology described herein.
Figure 2A:
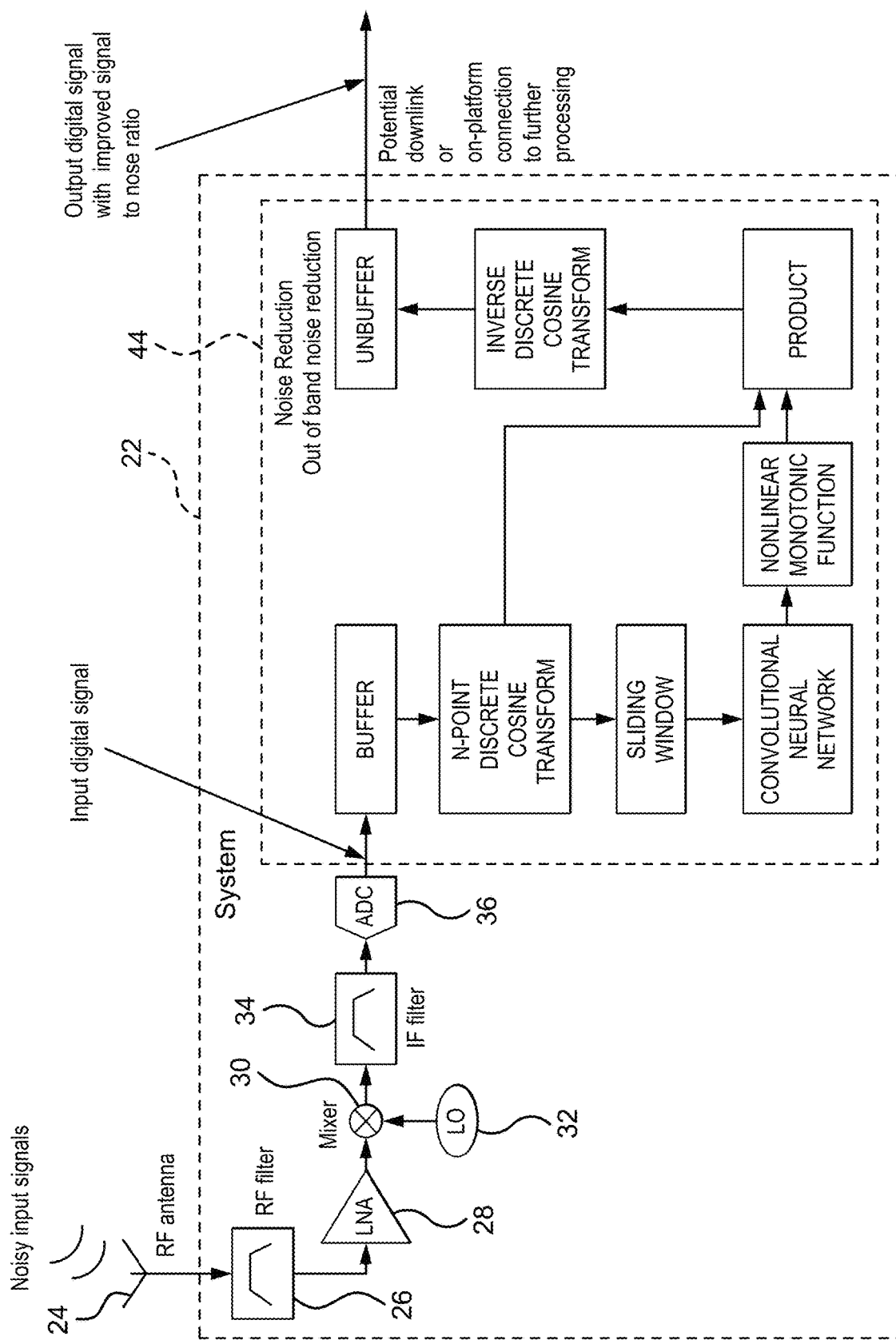
FIG. 2A is a block diagram of an example of a receiver system according to the technology described herein.

With continuing reference to FIGS. 1 and 2A, a receive chain 20 is shown in which a receiver system 22 includes an antenna 24, an RF filter 26, a low noise amplifier (LNA) 28, a mixer 30, a local oscillator (LO) 32, an optional intermediate frequency (IF) filter 34, an analog to digital converter (ADC) 36, a signal detection processor 38, a matched filter 40, and a signal demodulator 42. The receive chain 20 can also include optional application specific processors (not shown). The illustrated receiver system 22 includes a noise reduction processor 44 to improve the downstream signal detection and demodulation results. More particularly, the noise reduction processor 44 is inserted in the receive chain 20 after the ADC 36 and prior to the signal detection processor 38.

As will be discussed in greater detail, the noise reduction processor 44 improves the signal to noise ratio (SNR) of low power RF signals with respect to the total noise energy in a wide instantaneous bandwidth using transforms and CNN processing. The noise reduction processor 44 can achieve near real-time performance when implemented on computing platforms with CPUs, FPGAs and AI accelerators. Moreover, the receiver system 22 does not need to be re-configured to process specific signal types during operation or deployed with a signal type library to improve the SNR. Thus, classifications of the received energy can be bypassed.

Figure 2B:
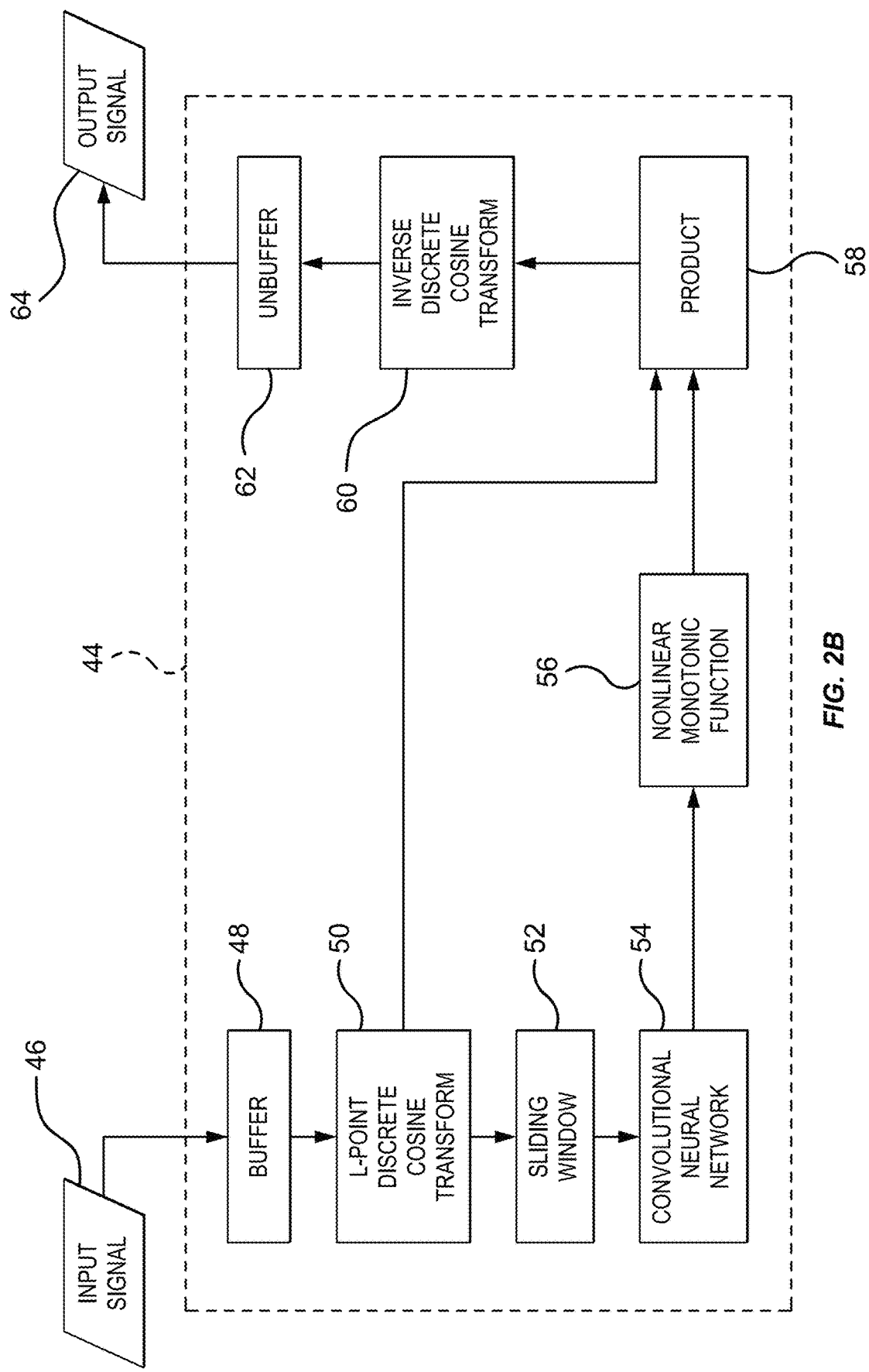
FIG. 2B is a block diagram of an example of a semiconductor apparatus according to the technology described herein.

With continuing reference to FIGS. 2A and 2B, an input signal 46 (e.g., input time-domain waveform containing zero or more signals embedded in noise) is buffered at a processing block 48 into segments of fixed length L. An L-point discrete cosine transform (DCT) 50 is performed on each segment and a sliding window 52 of multiple one-dimensional (1D) segments is concatenated to form a two-dimensional (2D) matrix (e.g., 2D input segment). In addition, nonlinear functions of the DCT segments are included in the 2D matrix.

In the technology described herein, the 2D matrix is used as an input to a CNN 54. The output of the CNN 54 is an estimate of the probability that a signal exists in each DCT frequency component (e.g., bin). In one example, the output of the CNN 54 is provided to a nonlinear monotonic function 56 and a product processing block 58, which use the estimated signal probability to scale the DCT components linearly with the predicted signal power density. This scaling has the effect of removing out-of-band noise while keeping in-band noise, which minimizes signal distortion for a given SNR improvement. An inverse DCT (IDCT) 60 is performed on each denoised segment, wherein an unbuffer processing block 62 unbuffers the output of the IDCT 60 to produce an output signal 64 (e.g., denoised time-domain output waveform).

Computing platform architectures with programmable logic such as, for example, FPGAs and AI accelerators can process large amounts of data and matrix multiplications. An example architecture to process such data and multiplications in near real-time is the XILINX VERSAL adaptive compute acceleration platform (ACAP), which contains AI engines as well FPGAs.

The technology described herein therefore improves the signal to noise ratio of the digital input signal 46 with respect to the total noise energy in the system channel bandwidth and is capable of processing wideband signals. The technology also does not require a priori knowledge of the received input signal 46 and generates the digital output signal 64 with improved signal power relative to the system channel noise power. Moreover, examples process wide instantaneous bandwidth (e.g., 1 GHz) energy in near real-time. The technology described herein also applies convolutional neural network approaches from the image processing domain to radio frequencies in the digital signal processing domain.

The construction of the time domain signal input features used by the CNN 54 is achieved by concatenating DCT 50 segments and adding nonlinear functions combined with the CNN 54 estimated signal probability that is used to determine whether the output DCT 50 bin contains a transmitted signal (e.g., message). In order to improve the probability of detection of low power signals for a variety of waveforms, the system finds correlations across large and small time windows. The DCT 50 enables the correlations to be detected by using a single value rather than a sequence (e.g., providing less complex and easier correlation). The CNN 54 enables correlations to be detected efficiently.

Alternatively, the CNN 54 can predict the probability of a signal in a frequency bin, which is then used in Bayesian estimation, maximizing the conditional probability by removing the energy in a bin if a signal is not present and enhancing the energy if a signal is present. This approach is an example of maximum a posteriori probability prediction.

In addition to removing additive white Gaussian noise system channel noise, the AI model can be trained to support other types of noise by adjusting the nonlinear monotonic function. Additionally, since the CNN 54 can assume there will be a similar response for signals versus non-signals in the system channel bandwidth, the technology described herein reduces the computation required during both training and inferencing (e.g., application of the neural network/NN).

Examples reduce the time and processing to detect signals in a wide instantaneous bandwidth and are deployable on communications and surveillance/monitoring assets in military, law enforcement and/or commercial operations that rely on quickly finding and reacting to RF signals in noisy RF environments as well as the systems that are used to test the operational systems. The systems can be hosted on platforms that have size, weight and power constraints (SWaP) (e.g., satellites and mobile unmanned air/sea vehicles).

In one example, the noise reduction processor 44 is used on board a vehicle or on remote processor that receives the signal at another location (e.g., on unmanned vehicles and ground stations). The processing capability provides solutions with smaller size, weight and power for on-board systems.

In civil and defense U.S. Government space-based applications, this capability enhances detections of weak signals. For example, in satellite communications, the technology described herein can improve SNR over fading conditions of RF signals, where atmospheric conditions have an impact based on the frequency of use (e.g., higher frequencies can be more lossy due to atmospheric effects such as snow, ice crystals, rain, fog, haze, smoke, etc.). Increased sensitivity can improve communication relays used by future lunar base stations to Earth and orbiting platforms in off nominal communication scenarios. Additionally, the technology described herein enhances receiver ability to detect previously unknown signals with low SNR, which is valuable for satellite-based warning systems. Moreover, for scientific systems such as radio astronomy or weather sensors, noise reduction improves sensitivities. For example, radio astronomy applications search for very low frequency signals from distant events. If the presence of background noise is removed, the result can provide additional insight into the understanding of events in the universe. Indeed, while weather systems (e.g., ground/air or space based) can have acceptable predictability for events such as tornados, accelerated information to identify the emergence of a tornado is a significant safety factor improvement to imminent warning notifications, given the near-real time aspect of this capability.

In commercial applications, the technology described herein enhances the ability to clearly detect Pilot/Air Traffic Controller voice communications across poor connections. For commercial airline pilots, improved SNR in the audio communications is advantageous. Used in the radio system of a pilot, examples can improve the recorded voice that is detected by the Cockpit Voice Recorder, where information is critical in accident investigations. Additionally, in commercial satellite communications, improved SNR reduces the aperture size required for link closure. For example, a 3 decibel (dB) SNR improvement would potentially reduce the aperture size by nearly half. This size reduction can have a recognizable reduction in cost and weight. These use cases are merely examples and other use cases may also benefit from the technology described herein.

CNN Processing Using DCT Input Data

The operations included in the CNN 54 to process DCT data to yield the DCT 50 component scaling for noise reduction are as follows. The procedure uses the CNN 54 to process real-valued inputs, composed of a 2D matrix of DCT segments of the waveform and nonlinear functions thereof. Specifically, multiple 1D segments of the DCT-transformed input are concatenated to form a 2D matrix with a frequency dimension and an additional channel dimension. In addition, included in the matrix are nonlinear functions of the DCT segments using techniques such as an Exponential Moving Average (EMA).

The CNN 54 operates on the 2D input matrix and outputs a 1D vector with the same length as the DCT length, where each output value is the predicted probability that a signal component is present in the input DCT segment. The processing of the CNN 54 includes two stages: 1) feature extraction and 2) feature regression. The feature extraction stage uses multiple layers of the CNN 54 with channel dimension and kernel size both greater than one and a Rectifier Linear Unit (ReLU) activation function.

The feature regression stage uses a single convolutional layer with channel dimension and kernel size both equal to one and a sigmoid activation function. The output of this layer is a vector of predicted probabilities that the corresponding DCT frequency bins contain signal components as opposed to only noise components. The output of the feature regression stage is further transformed by the nonlinear monotonic function 56 to obtain the DCT component scaling vector of length L:

A threshold value is set based on the approximate total SNR across the channel.

DCT frequency bins with estimated probability below the threshold (e.g., "noisy" frequency bins) use a scaling proportional to the square of that probability. This scaling is chosen to maximize the SNR (e.g., the ratio between the sum of the power of the signal components and the power of the noise component, for additive white Gaussian noise (AWGN)). Alternatively, a different function can be used for other noise distributions.

Bins with estimated probability above the threshold use unity scaling.

Figure 3A:
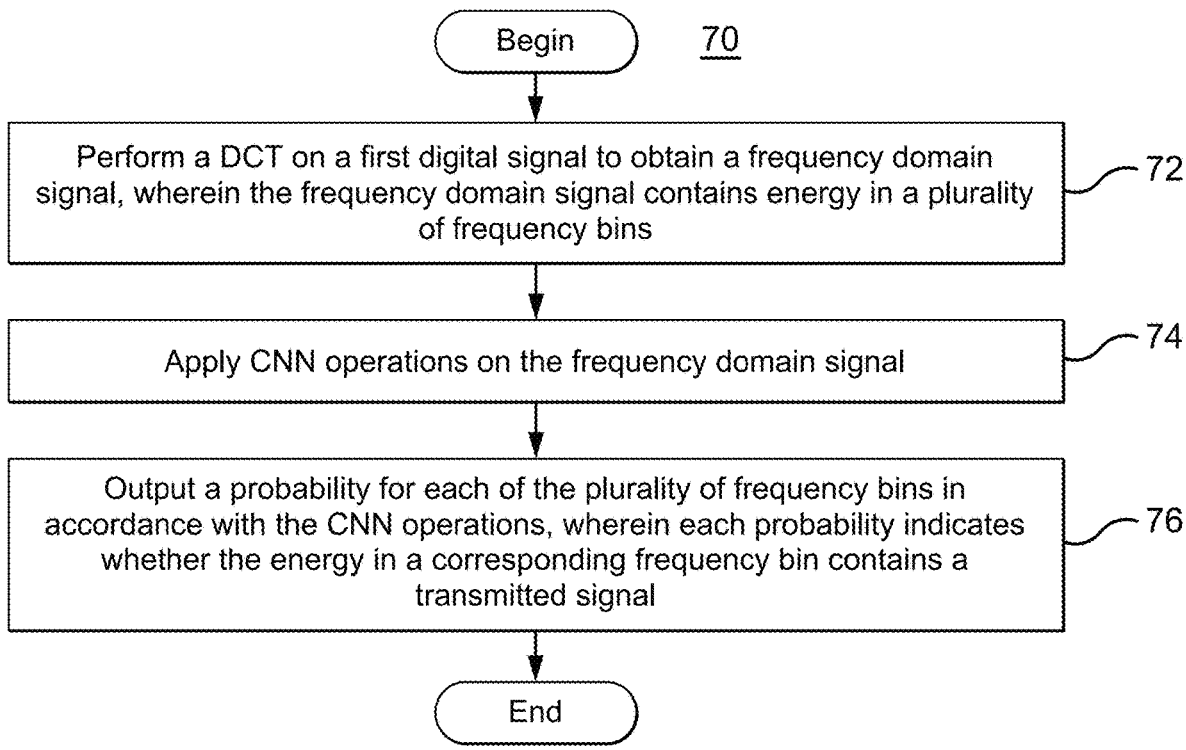
FIGS. 3A and 3B are flowcharts of examples of methods of operating a performance-enhanced computing system according to the technology described herein.

FIG. 3A shows a method 70 of operating a performance-enhanced computing system. The method 70 can generally be implemented in a noise reduction processor such as, for example, the noise reduction processor 44 (FIGS. 1-2B), already discussed. More particularly, the method 70 can be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Illustrated processing block 72 performs a DCT on a first digital signal to obtain a frequency domain signal, wherein the frequency domain signal contains energy in a plurality of frequency bins. Block 74 applies CNN operations on the frequency domain signal. In the technology described herein, block 74 bypasses a classification of the energy in the plurality of frequency bins. Block 76 outputs a probability for each of the plurality of frequency bins in accordance with the CNN operations, wherein each probability indicates whether the energy in a corresponding frequency bin contains a transmitted signal (e.g., message, communication). The method 70 therefore enhances performance at least to the extent that using the CNN operations to detect multiple signals across the plurality of frequency bins enables wide instantaneous bandwidth signal processing. Indeed, the CNN operations can reduce latency enough to enable real-time or near real-time signal processing. Additionally, bypassing the classification of the energy in the frequency bins obviates any need to have a priori knowledge of the input signals received.

Figure 3B:
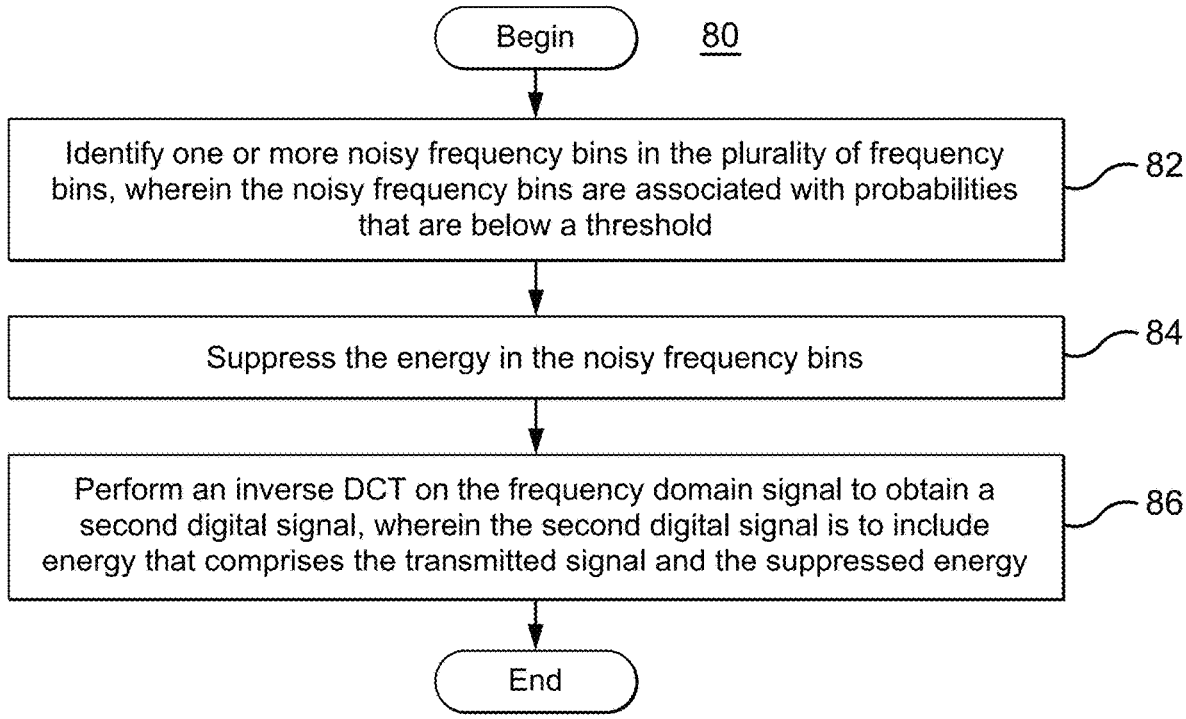

FIG. 3B shows another method 80 of operating a performance-enhanced computing system. The method 80 can generally be implemented in conjunction with the method 70 (FIG. 3A) in a noise reduction processor such as, for example, the noise reduction processor 44 (FIGS. 1-2B), already discussed. More particularly, the method 80 can be implemented in one or more modules as a set of logic instructions stored in a machine- or computer-readable storage medium such as RAM, ROM, PROM, firmware, flash memory, etc., in hardware, or any combination thereof.

Illustrated processing block 82 provides for identifying one or more noisy frequency bins in the plurality of frequency bins, wherein the noisy frequency bins are associated with probabilities that are below a threshold. Block 84 suppresses the energy in the noisy frequency bins. In one example, block 84 uses the estimated signal probability to scale the DCT components linearly with the predicted signal power density. This scaling has the effect of removing out-of-band noise while keeping in-band noise, which minimizes signal distortion for a given SNR improvement. Block 86 performs an inverse DCT on the frequency domain signal to obtain a second digital signal, wherein the second digital signal includes energy that comprises the transmitted signal and the suppressed energy. The method 80 therefore further enhances performance at least to the extent that suppressing the energy in the noisy frequency bins enhances SNR and speeds up downlink detection processing, feature extraction and/or bit recovery (e.g., demodulation).

Figure 3C:
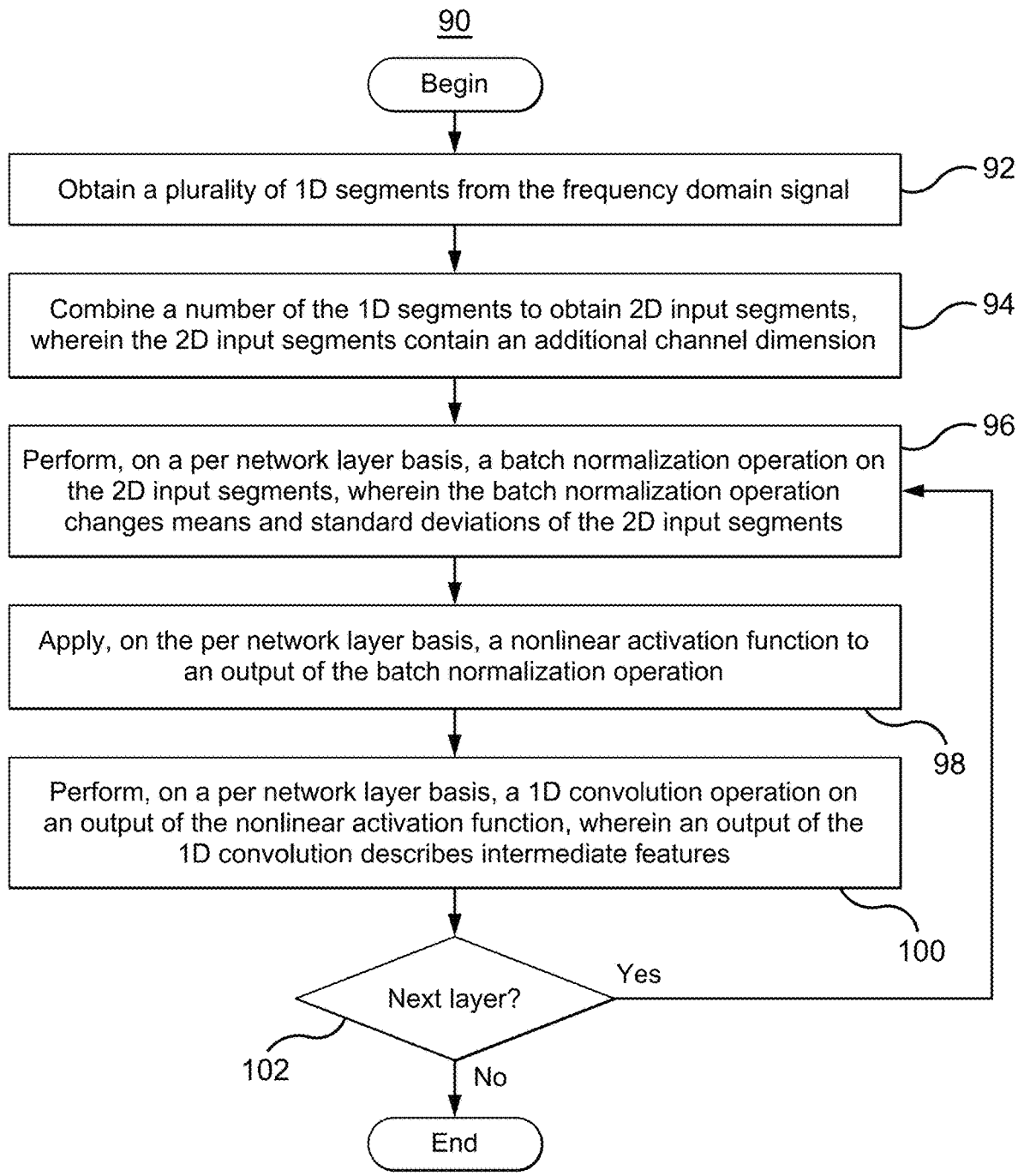
FIG. 3C is a flowchart of an example of a method of applying convolutional neural network (CNN) operations on a frequency domain signal according to the technology described herein.

FIG. 3C shows a method 90 of applying CNN operations on a frequency domain signal. The method 90 can generally be incorporated into processing block 74 (FIG. 3A) and implemented in a noise reduction processor such as, for example, the noise reduction processor 44 (FIGS. 1-2B), already discussed. More particularly, the method 90 can be implemented in one or more modules as a set of logic instructions stored in a machine- or computer-readable storage medium such as RAM, ROM, PROM, firmware, flash memory, etc., in hardware, or any combination thereof.

Illustrated processing block 92 provides for obtaining a plurality of 1D segments from the frequency domain signal, wherein block 94 combines (e.g., concatenates) a number of the 1D segments to obtain 2D input segments, and wherein the 2D input segments contain an additional channel dimension. Block 96 iteratively performs, on a per network layer basis, a batch normalization (BN) operation on the 2D input segments, wherein the batch normalization operation changes means and standard deviations of the 2D input segments. Block 98 iteratively applies, on the per network layer basis, a nonlinear activation function to an output of the batch normalization operation. Additionally, block 100 iteratively performs, on the per network layer basis, a 1D convolution operation on an output of the nonlinear activation function, wherein an output of the 1D convolution describes intermediate features. Block 102 can determine whether there is a next layer in the CNN. If so, the method 90 returns to block 96. Otherwise, the method 90 terminates. The method 90 therefore further enhances performance at least to the extent that concatenating DCT segments and adding nonlinear functions combined with estimated signal probability improves signal detection accuracy across large and small time windows (e.g., using a single value rather than a sequence, providing less complex and easier correlation).

Figure 3D:
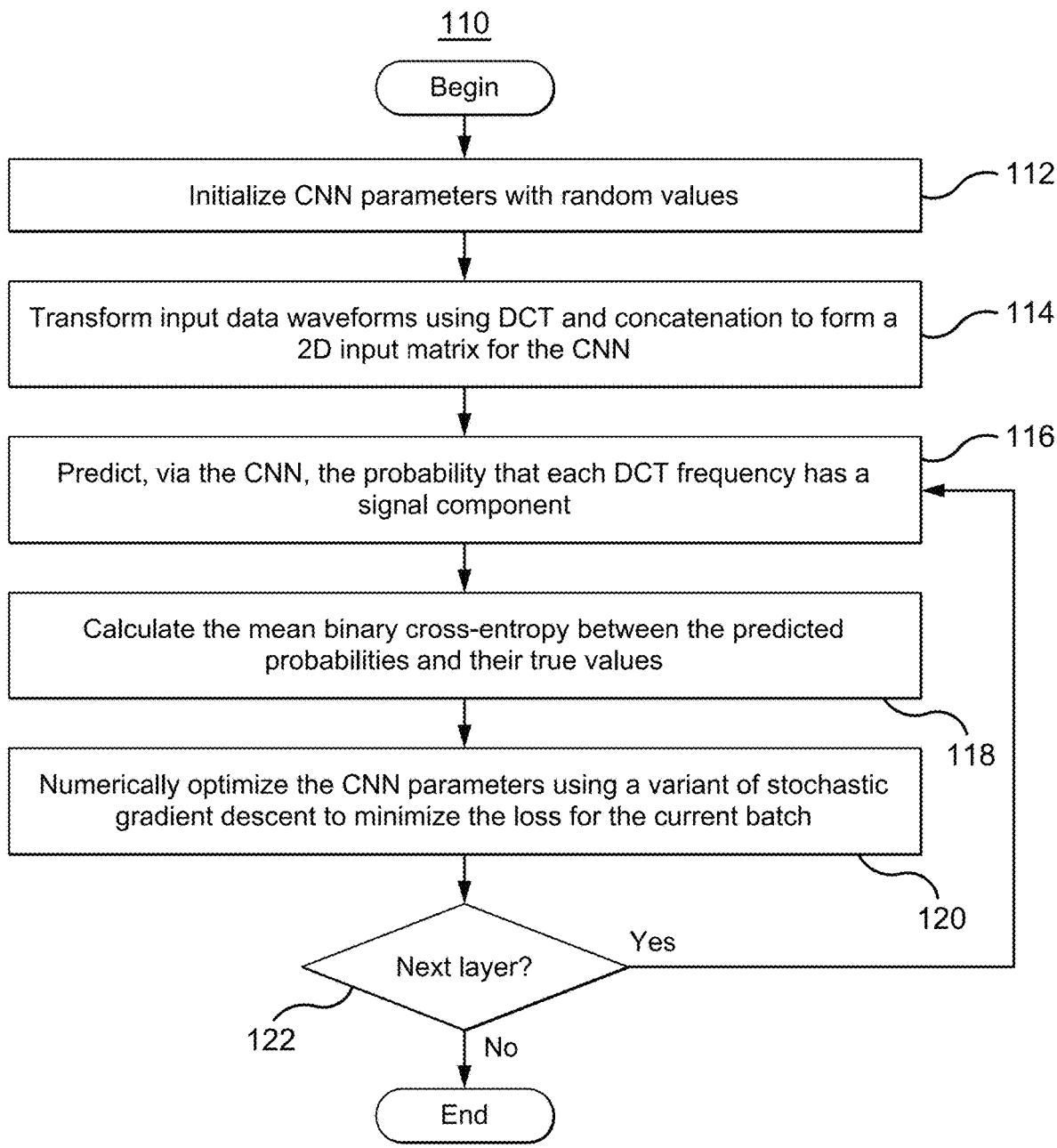
FIG. 3D is a flowchart of an example of a method of training a CNN according to the technology described herein.

FIG. 3D shows a method 110 of training a CNN. The method 110 can generally be implemented in a noise reduction processor such as, for example, the noise reduction processor 44 (FIGS. 1-2B), already discussed. More particularly, the method 110 can be implemented in one or more modules as a set of logic instructions stored in a machine- or computer-readable storage medium such as RAM, ROM, PROM, firmware, flash memory, etc., in hardware, or any combination thereof.

Illustrated processing block 112 provides for initializing CNN parameters with random variables, wherein block 114 transforms input data waveforms using DCT and concatenation to form a 2D input matrix for the CNN. In one example, block 116 predicts, via the CNN, the probability that each DCT frequency has a signal component and block 118 calculates the mean binary cross-entropy between the predicted probabilities and their true values. Block 120 numerically optimizes the CNN parameters using a variant of stochastic gradient descent to minimize the loss for the current batch. Block 122 determines whether there is a next batch. If so, the method 110 returns to block 114. Otherwise, the method 110 terminates.

Figure 4:
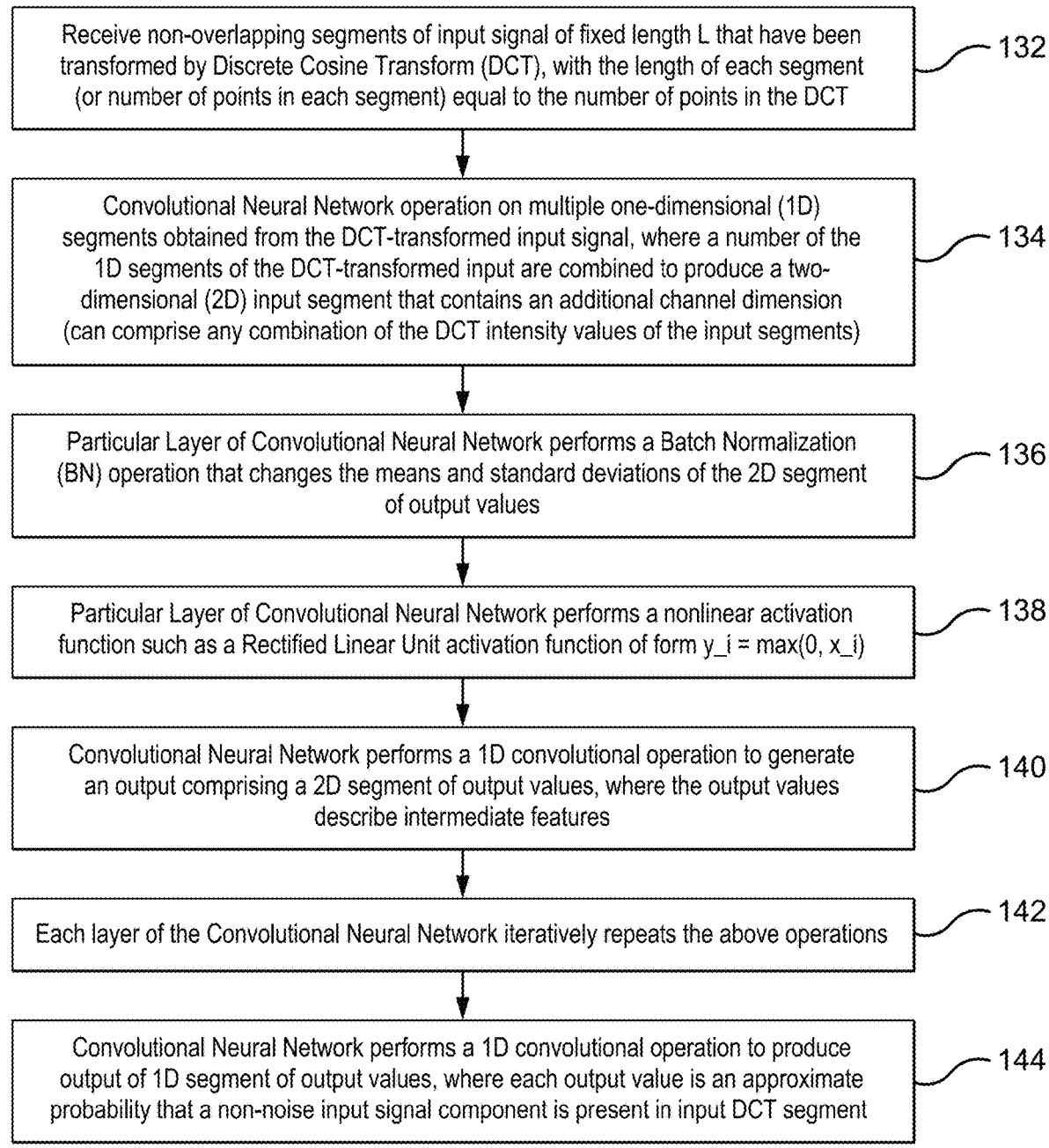
FIG. 4 is a flowchart of an example of a more detailed method of applying CNN operations on a frequency domain signal according to the technology described herein.

FIG. 4 shows a more detailed method 130 of applying CNN operations on a frequency domain signal. The method 130 can generally be incorporated into block 74 (FIG. 3A) and implemented in a noise reduction processor such as, for example, the noise reduction processor 44 (FIGS. 1-2B), already discussed. More particularly, the method 130 can be implemented in one or more modules as a set of logic instructions stored in a machine- or computer-readable storage medium such as RAM, ROM, PROM, firmware, flash memory, etc., in hardware, or any combination thereof.

Illustrated processing block 132 receives non-overlapping segments of an input signal of fixed length L that have been transformed by DCT, with the length of each segment (or number of points in each segment) equal to the number of points in the DCT. In the technology described herein, block 134 conducts a CNN operation on multiple 1D segments obtained from the DCT-transformed input signal, where a number of the 1D segments of the DCT-transformed input are combined to produce a 2D input segment that contains an additional channel dimension. The 1D segments can comprise any combination of the DCT intensity values of the input segments.

In block 136, a particular layer of the CNN performs a BN operation that changes the means and standard deviations of the 2D segment of output values. In block 138, the particular layer of the CNN performs a nonlinear activation function such as, or example, a ReLU activation function of form $y\_i = \max(o, x\_i)$. In block 140, the particular layer of the CNN performs a 1D convolutional operation to generate an output comprising a 2D segment of output values, wherein the output values describe intermediate features. In block 142, each layer of the CNN iteratively repeats the above operations. In block 144, the CNN performs a 1D convolutional operation to produce an output of 1D segment of output values, where each output value is an approximate probability that a non-noise input signal component is present in the input DCT segment.

Figure 5:
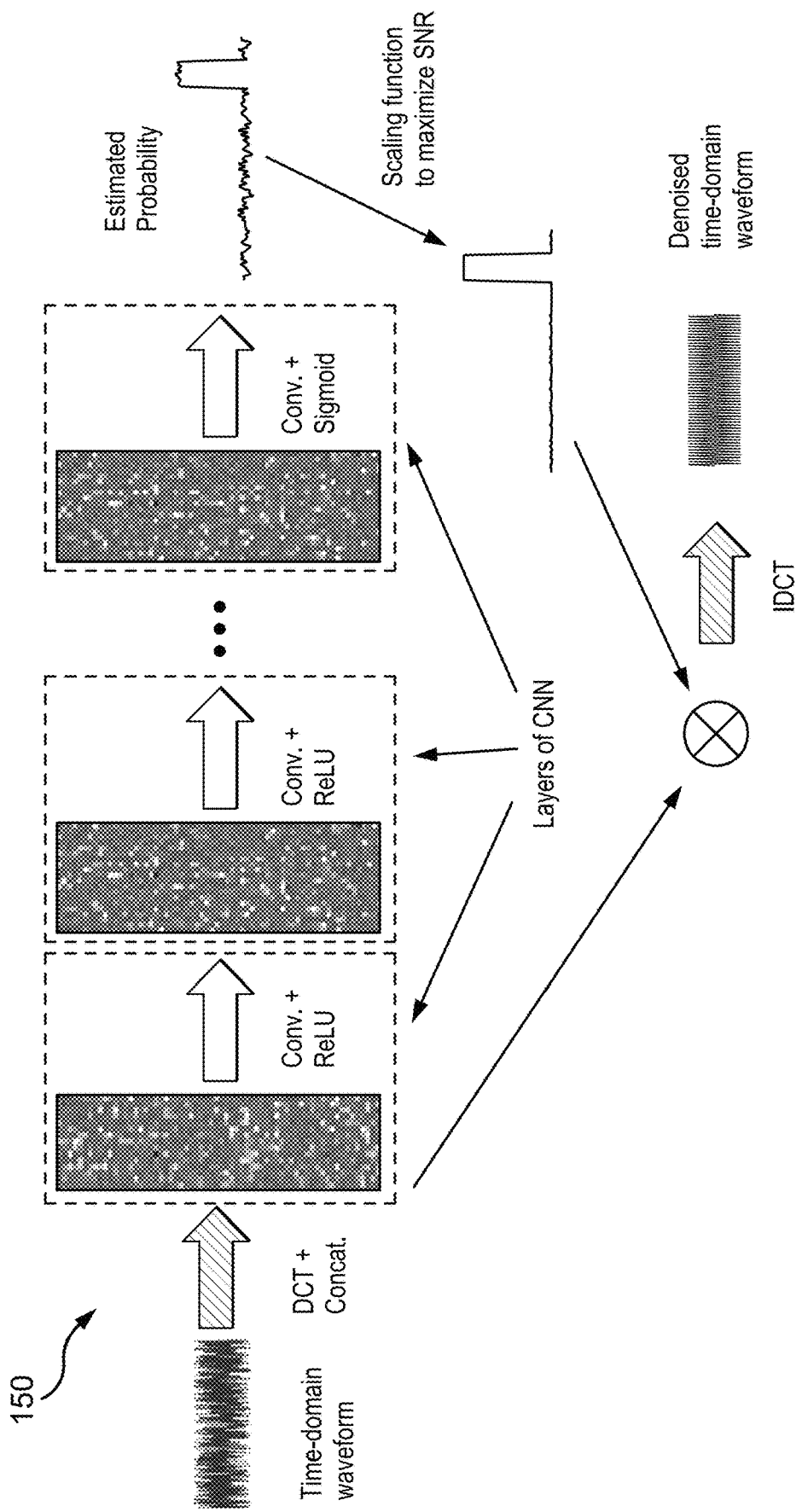
FIG. 5 is an illustration of an example of a noise reduction according to the technology described herein.

FIG. 5 demonstrates that a CNN 150 can have a feedforward structure with multiple layers. Each layer consists of a 1D convolution operation followed by a nonlinear activation function. The 1D convolution operation uses zero padding to preserve the size of the frequency dimension (L) and the channel dimension varies in size.

The 1D convolution operation is defined as:
For an input of shape L×N, an output of shape L× M, and convolution kernel of size K, the 1D convolution operation has M learnable weights each of shape K×N and learnable bias of size M. L refers to the size of the frequency dimension, and N and M are the input and output channel sizes, respectively.

The outputs of the convolution are given by $$\text{out}(m) = \text{bias}(m) + \sum_{n=1}^{N} \text{weight}(m, n) * \overline{\text{input}}(n),$$

where * is the cross-correlation operator, out (m) is the mth column of the output of shape L×M, bias (m) is the mth bias value, weight (m, n) is the nth column of the mth convolution weight, and $\overline{\text{input}}$(n) is the nth column of the zero-padded input of shape (L+K−1)×N.

The activation function is a nonlinear, element-wise function used in neural networks to separate layers. Typical activation functions are:

ReLU (rectified linear unit): f(x)=max(0, x)

Sigmoid: f(x)=1/(1+exp(−x))

Figure 6:
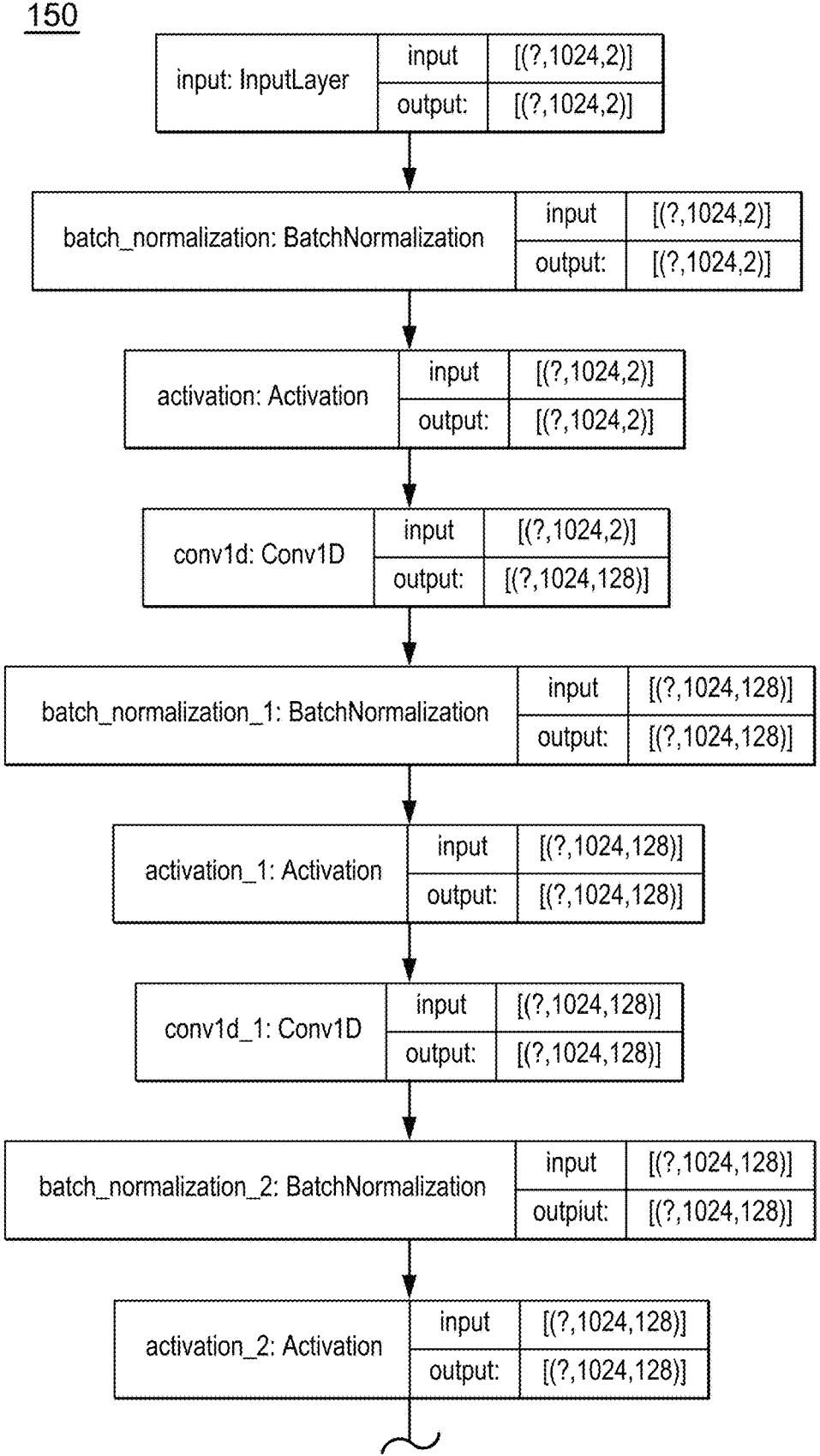
FIG. 6 is a block diagram of an example of a CNN according to the technology described herein.
Figure 6:
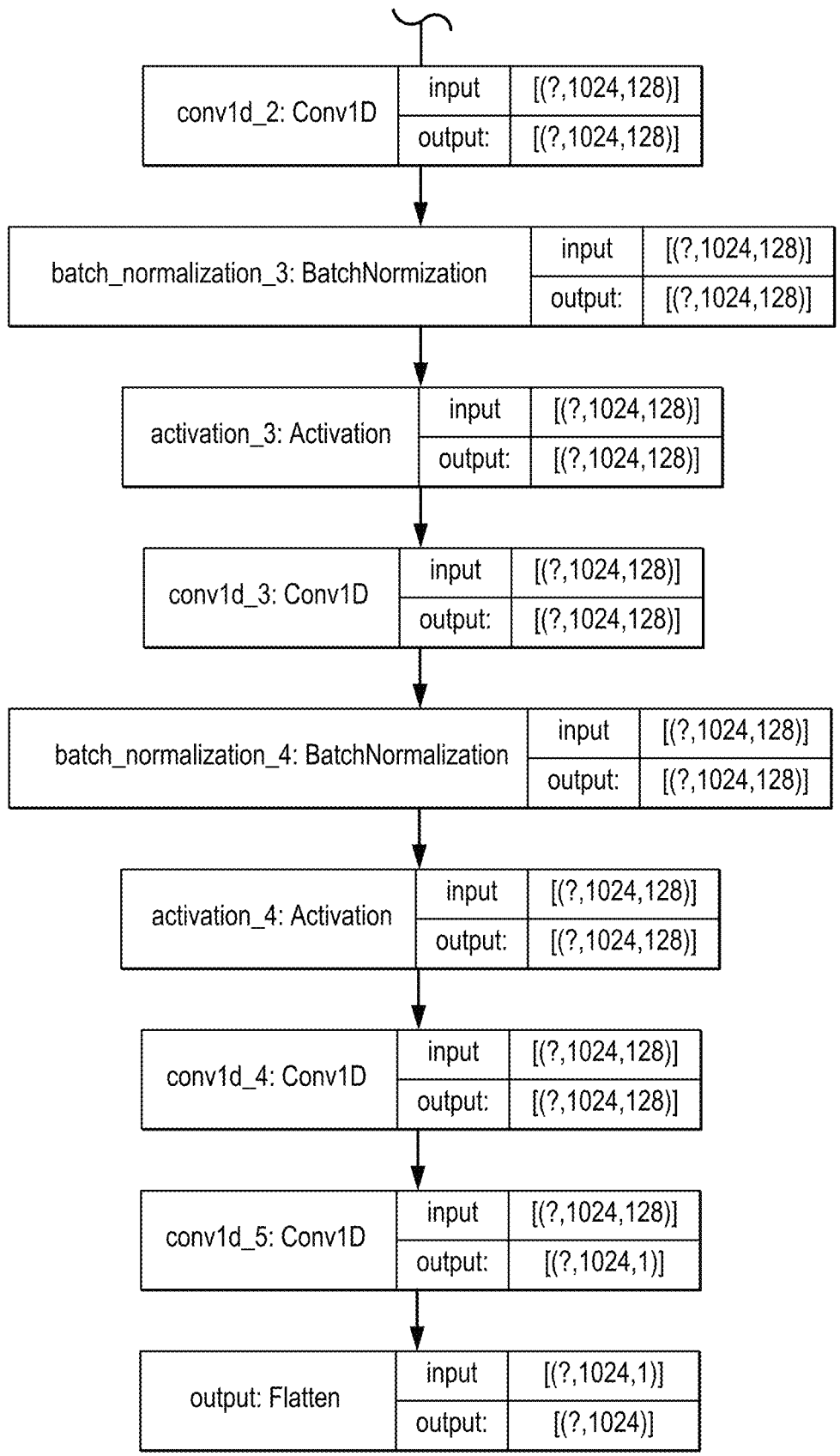

FIG. 6 shows the detailed layers of the CNN 150. In the illustrated example, the processing operations are expressed generally and do not include specific values, since the values would change depending on the target hardware capabilities.

Figure 7:
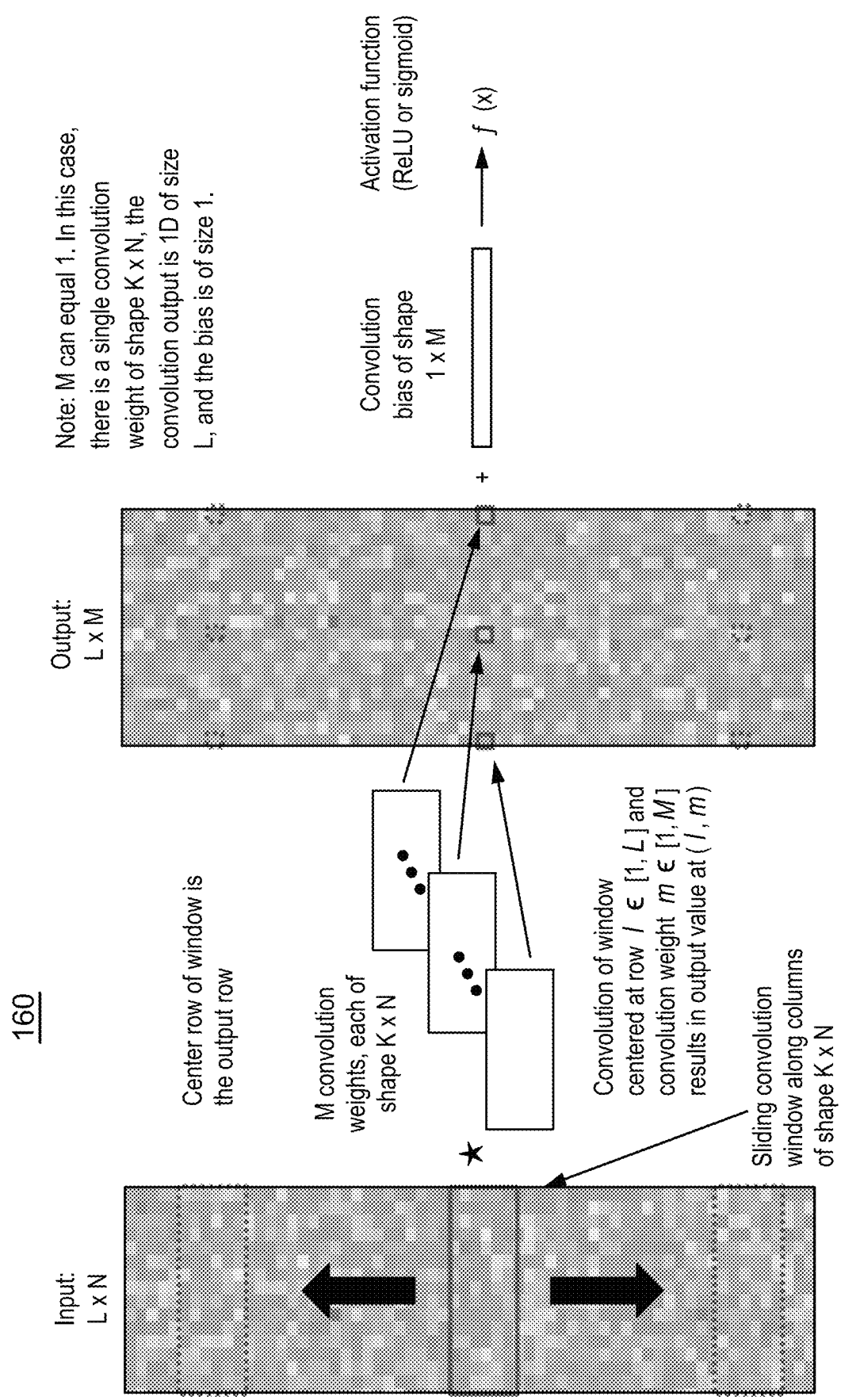
FIG. 7 is an illustration of an example of a one-dimensional (1D) convolution operation according to the technology described herein.

FIG. 7 shows the processing in a CNN layer 160 on an exemplar data representation. In the illustrated example, the center row of a sliding convolution window is the output row.

Sample Input Data and Training

The training data for the neural network includes a large number of examples of 1) input data of a real-valued time-domain waveform and 2) corresponding information of which frequency ranges of the waveform have signals present, as opposed to only noise.

Figure 8:
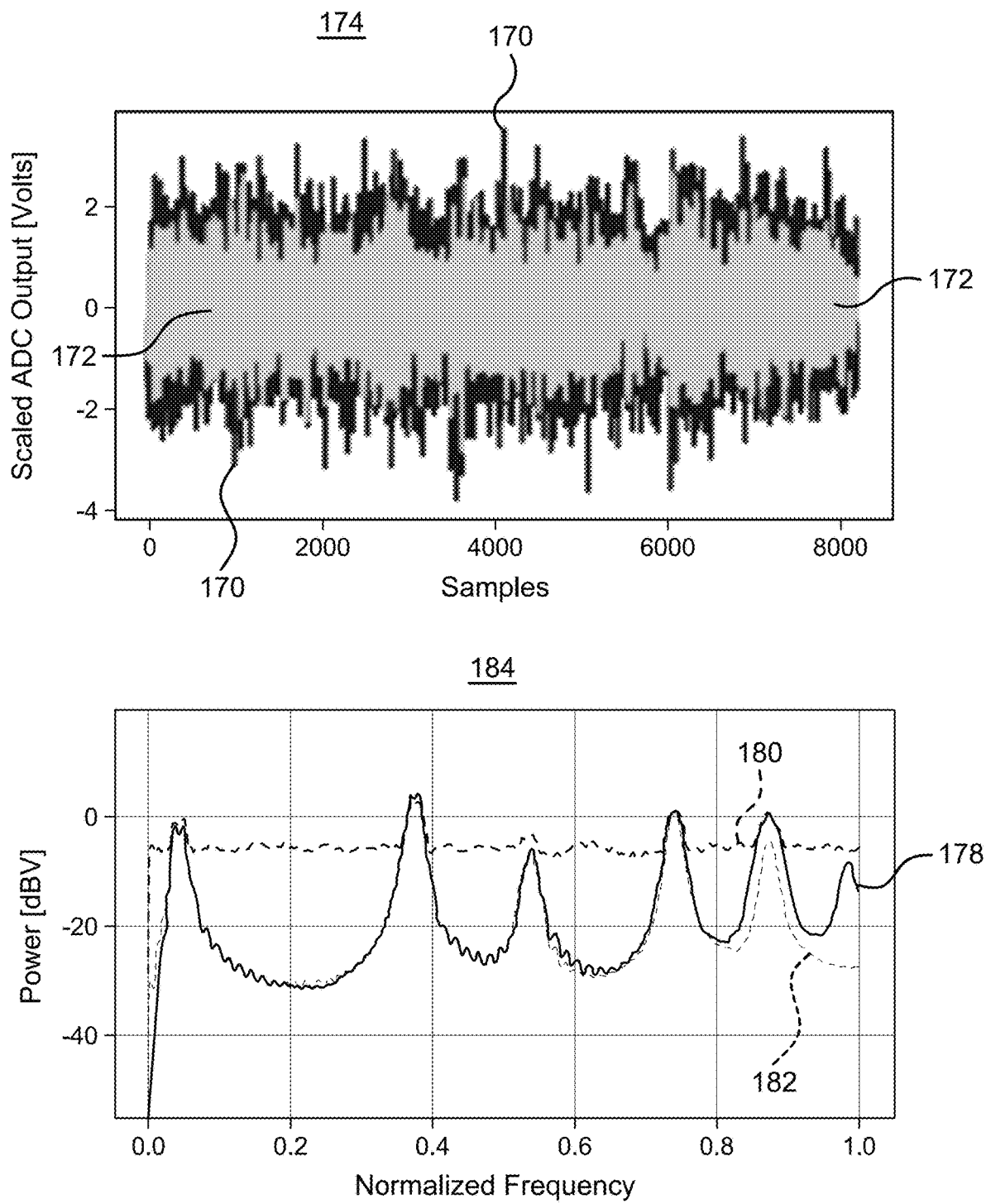
FIG. 8 is an illustration of an example of a time domain plot and a frequency domain plot according to the technology described herein.

FIG. 8 shows an example of a plot 174 of a sample input time domain data stream 170 post ADC processing and output data samples 172 in the time domain. The vertical axis is scaled ADC output in Volts and the horizontal axis is the sample number of the digitized RF input data stream 170.

Each input real-valued time-domain waveform consists of zero or more communication signals (e.g., transmitted signals/messages), each with different modulations, bandwidths, SNRs, carrier frequencies, and additive Gaussian noise. The waveforms are generated using an arbitrary random signal generator and a random noise generator. This input data is processed by the Discrete Cosine Transform and concatenated into a 2D matrix, as already discussed. The corresponding truth data to the input waveform is a vector of length L that contains only ones and zeros. A vector element is one if the corresponding DCT frequency bin contains any signal component and zero otherwise. This value is the probability that a signal component is present in that DCT bin.

A plot 184 demonstrates how the signals appear in a frequency versus power relationship. A reference input signal 178, a noisy input signal 180 (e.g., signal+noise) and an output signal 182 (e.g., signal with reduced noise in the system instantaneous bandwidth channel) are shown.

As already noted, the CNN can be trained using a supervised approach. First, the CNN parameters (e.g., weights and biases of the convolution operations) are initialized with random values. Then, the following operations are repeated for batches of input and truth data until a stopping criterion (e.g., number of iterations or absolute/relative error) is reached:

The input data waveforms are transformed using the DCT plus concatenation method to form a 2D input matrix for the CNN.

Convolution neural network (CNN) predicts the probability that each DCT frequency has a signal component.

The mean binary cross-entropy loss is calculated between the predicted probabilities and their true values.

The CNN parameters are numerically optimized using a variant of stochastic gradient descent to minimize the loss for the current batch.

Results

Figure 9:
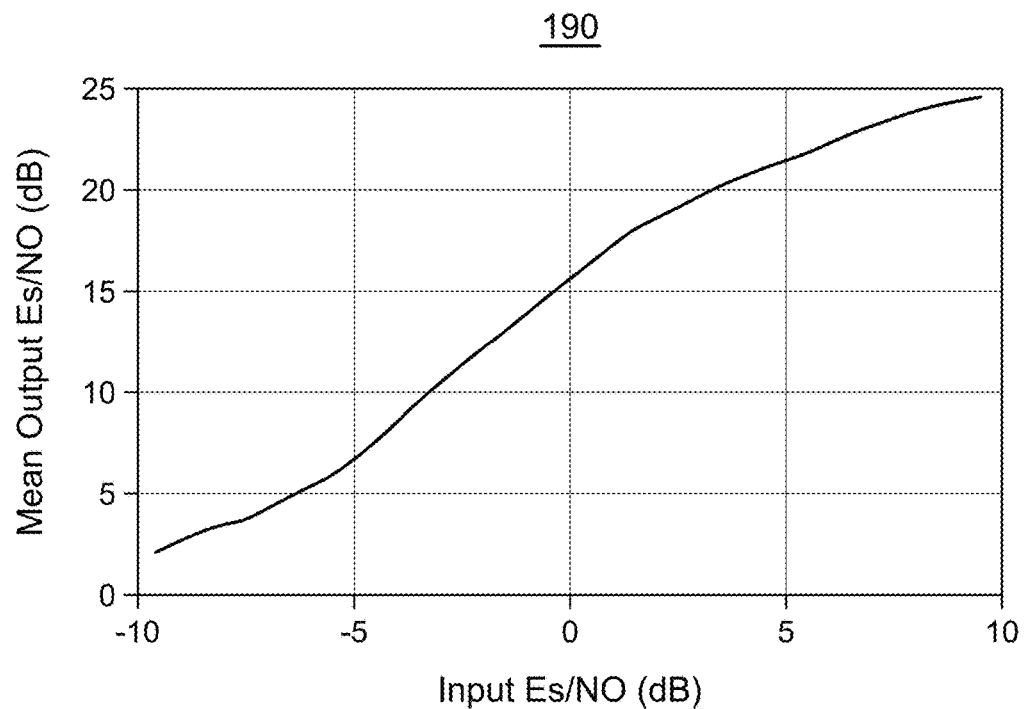
FIG. 9 is an illustration of an example of a signal to noise ratio (SNR) plot according to the technology described herein.

FIG. 9 shows an SNR chart 190. The chart 190 demonstrates that the noise floor can be lowered by 25 dB/Hz for input signals with a low signal to noise ratio.

Hardware Development

Figure 10:
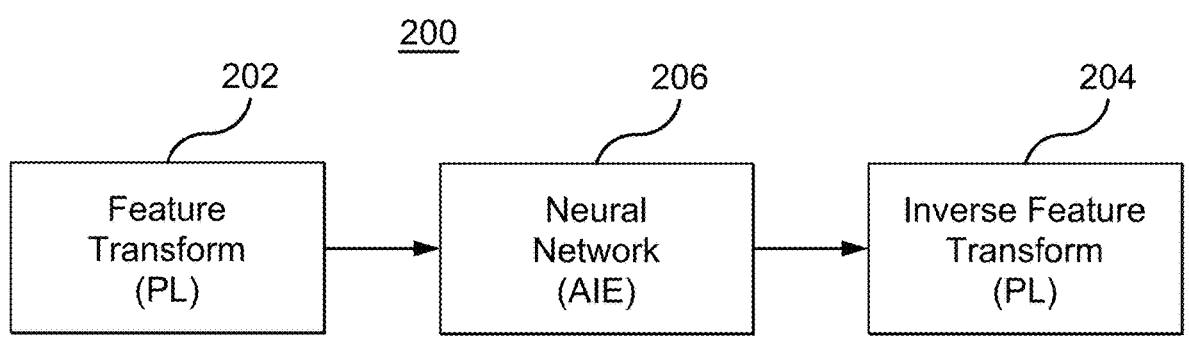
FIG. 10 is a block diagram of an example of a hybrid hardware architecture according to the technology described herein.

FIG. 10 shows a hybrid hardware architecture 200 that takes advantage of heterogeneous processing by partitioning the design between Programmable Logic (PL) and AI Engines (AIE). The programmable logic can be implemented in Field Programmable Gate Arrays (FPGAs) and the AIE can be implemented in an AI accelerator. In the illustrated example, feature transform hardware 202 and inverse feature transform hardware 204 includes programmable logic and neural network hardware 206 includes AI Engines. The (Inverse) Feature Transform is kept in PL to leverage flexibility for signal processing tasks and the Convolutional Neural Network (CNN) is targeted towards AIEs to leverage superior compute capability.

Figure 11:
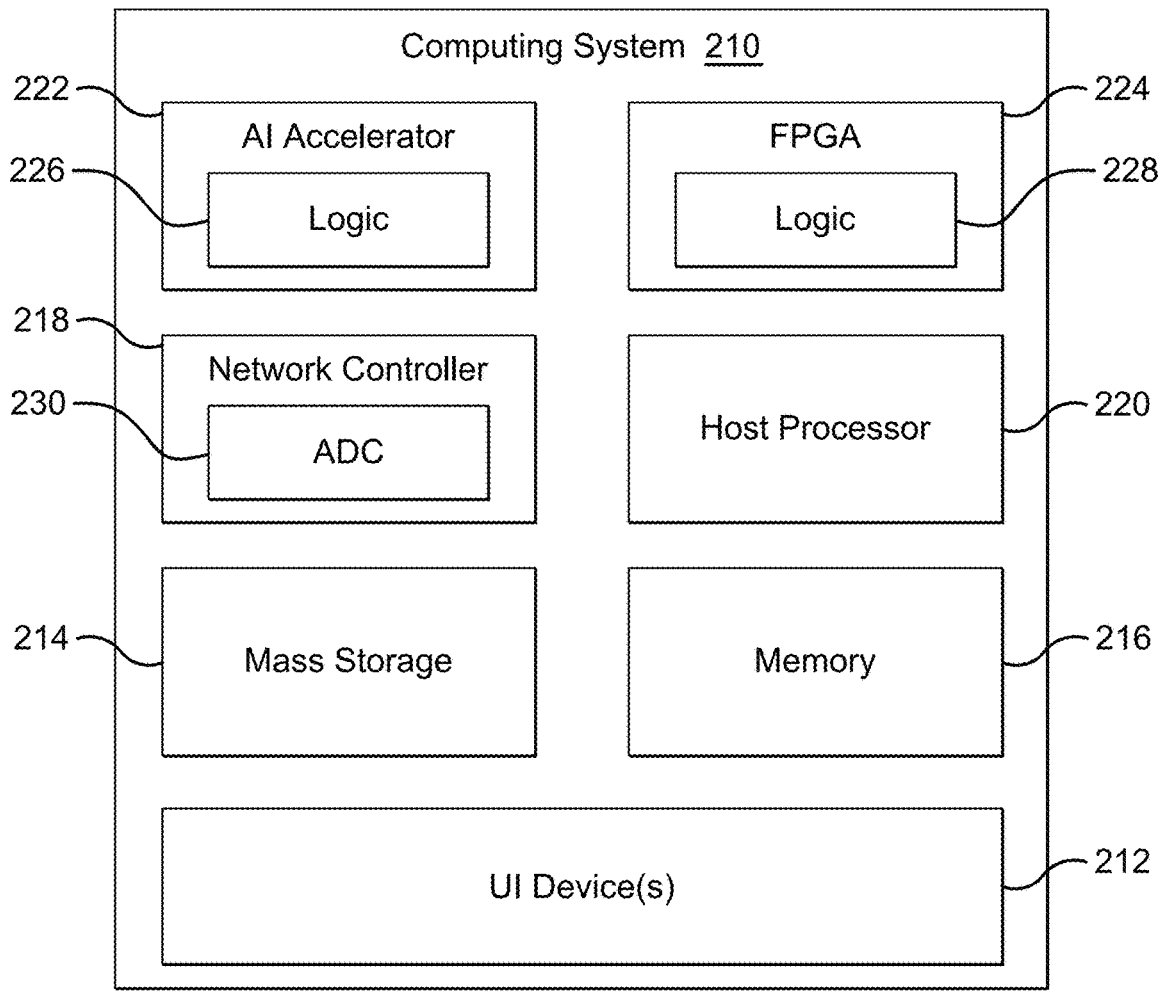
FIG. 11 is a block diagram of an example of a performance-enhanced computing system according to the technology described herein.

FIG. 11 shows a performance-enhanced computing system 210 that includes one or more user interface (UI) devices 212, mass storage 214 (e.g., flash memory, hard disk drive/HDD, solid state drive/SSD), memory 216 (e.g., dynamic RAM/DRAM), a network controller 218 (wired and/or wireless), a host processor 220, an AI accelerator 222 and an FPGA 224. In the technology described herein, the AI accelerator 222 includes logic 226 and the FPGA 224 includes logic 228, wherein the logic 226, 228 is implemented at least partly in one or more of configurable or fixed-functionality hardware. Additionally, the network controller 218 can include an ADC 230 to convert a waveform to a first digital signal and the logic 226, 228 can implement one or more aspects of the method 70 (FIG. 3A), the method 80 (FIG. 3B), the method 90 (FIG. 3C), the method 110 (FIG. 3D) and/or the method 130 (FIG. 4), already discussed.

Therefore, the logic 226, 228 can perform a DCT on the first digital signal to obtain a frequency domain signal, wherein the frequency domain signal contains energy in a plurality of frequency bins. In the technology described herein, the logic 226, 228 also applies CNN operations on the frequency domain signal and outputs a probability for each of the plurality of frequency bins, wherein each probability indicates whether the energy in a corresponding frequency bin contains a transmitted signal. Additionally, the logic 226, 228 can identify one or more noisy frequency bins in the plurality of frequency bins, wherein the noisy frequency bins are associated with probabilities that are below a threshold. In such a case, the logic 226, 228 suppresses the energy in the noisy frequency bins and performs an inverse DCT on the frequency domain signal to obtain a second digital signal, wherein the second digital signal is to include energy that comprises the transmitted signal and the suppressed energy.

The computing system 210 is therefore considered performance-enhanced at least to the extent that using the CNN operations to detect multiple signals across the plurality of frequency bins enables wide instantaneous bandwidth signal processing. Indeed, the CNN operations can reduce latency enough to enable real-time or near real-time signal processing. Additionally, bypassing the classification of the energy in the frequency bins obviates any need to have a priori knowledge of the input signals received. Additionally, suppressing the energy in the noisy frequency bins enhances SNR and speeds up downlink detection processing, feature extraction and/or bit recovery (e.g., demodulation).

Figure 12:
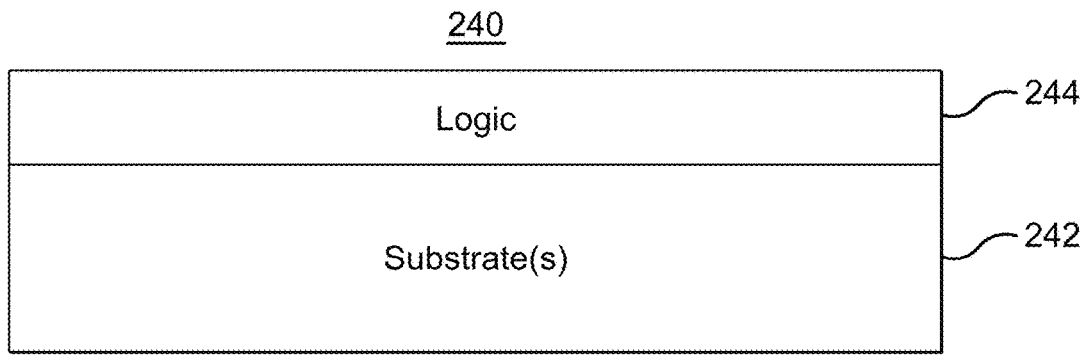
FIG. 12 is an illustration of an example of a semiconductor apparatus according to the technology described herein.

FIG. 12 shows a semiconductor apparatus 240 (e.g., chip, die, package). The illustrated apparatus 240 includes one or more substrates 242 (e.g., silicon, sapphire, gallium arsenide) and logic 244 (e.g., transistor array and other integrated circuit/IC components) coupled to the substrate(s) 242 In the technology described herein, the logic 244 implements one or more aspects of the method 70 (FIG. 3A), the method 80 (FIG. 3B), the method 90 (FIG. 3C), the method 110 (FIG. 3D) and/or the method 130 (FIG. 4), already discussed, and can be readily substituted for the logic 226, 228 (FIG. 11), already discussed.

Additional Notes and Examples

Example one includes a computing system comprising an analog to digital converter to convert a waveform to a first digital signal, and a processor including logic coupled to one or more substrates, the logic to perform a discrete cosine transform (DCT) on the first digital signal to obtain a frequency domain signal, wherein the frequency domain signal contains energy in a plurality of frequency bins, apply convolutional neural network (CNN) operations on the frequency domain signal, output a probability for each of the plurality of frequency bins, wherein each probability indicates whether the energy in a corresponding frequency bin contains a transmitted signal, identify one or more noisy frequency bins in the plurality of frequency bins, wherein the noisy frequency bins are associated with probabilities that are below a threshold, suppress the energy in the noisy frequency bins, and perform an inverse DCT on the frequency domain signal to obtain a second digital signal, wherein the second digital signal is to include energy that comprises the transmitted signal and the suppressed energy.

Example two includes the computing system of Example one, wherein the logic is further to obtain a plurality of one-dimensional (1D) segments from the frequency domain signal, and combine a number of the 1D segments to obtain two-dimensional (2D) input segments, wherein the 2D input segments contain an additional channel dimension.

Example three includes the computing system of Example two, wherein the logic is further to iteratively perform, on a per network layer basis, a batch normalization operation on the 2D input segments, and wherein the batch normalization operation changes means and standard deviations of the 2D input segments.

Example four includes the computing system of Example three, wherein the logic is further to iteratively apply, on the per network layer basis, a nonlinear activation function to an output of the batch normalization operation.

Example five includes the computing system of Example four, wherein the logic is further to iteratively perform, on the per network layer basis, a 1D convolution operation on an output of the nonlinear activation function, and wherein an output of the 1D convolution operation is to describe intermediate features.

Example six includes the computing system of Example one, wherein the logic is further to bypass a classification of the energy in the plurality of frequency bins.

Example seven includes a semiconductor apparatus comprising one or more substrates, and logic coupled to the one or more substrates, wherein the logic is implemented at least partly in one or more of configurable or fixed-functionality hardware, the logic to perform a discrete cosine transform (DCT) on a first digital signal to obtain a frequency domain signal, wherein the frequency domain signal contains energy in a plurality of frequency bins, apply convolutional neural network (CNN) operations on the frequency domain signal, and output a probability for each of the plurality of frequency bins in accordance with the CNN operations, wherein each probability indicates whether the energy in a corresponding frequency bin contains a transmitted signal.

Example eight includes the semiconductor apparatus of Example seven, wherein the logic is further to identify one or more noisy frequency bins in the plurality of frequency bins, wherein the noisy frequency bins are associated with probabilities that are below a threshold, suppress the energy in the noisy frequency bins, and perform an inverse DCT on the frequency domain signal to obtain a second digital signal, wherein the second digital signal is to include energy that comprises the transmitted signal and the suppressed energy.

Example nine includes the semiconductor apparatus of Example seven, wherein the logic is further to obtain a plurality of one-dimensional (1D) segments from the frequency domain signal, and combine a number of the 1D segments to obtain two-dimensional (2D) input segments, wherein the 2D input segments contain an additional channel dimension.

Example ten includes the semiconductor apparatus of Example nine, wherein the logic is further to iteratively perform, on a per network layer basis, a batch normalization operation on the 2D input segments, and wherein the batch normalization operation is to change means and standard deviations of the 2D input segments.

Example eleven includes the semiconductor apparatus of Example ten, wherein the logic is further to iteratively apply, on the per network layer basis, a nonlinear activation function to an output of the batch normalization operation.

Example twelve includes the semiconductor apparatus of Example eleven, wherein the logic is further to iteratively perform, on the per network layer basis, a 1D convolution operation on an output of the nonlinear activation function, and wherein an output of the 1D convolution operation is to describe intermediate features.

Example thirteen includes the semiconductor apparatus of Example seven, wherein the logic is further to bypass a classification of the energy in the plurality of frequency bins.

Example fourteen includes at least one computer readable storage medium comprising a set of instructions, which when executed by a computing system, cause the computing system to perform a discrete cosine transform (DCT) on a first digital signal to obtain a frequency domain signal, wherein the frequency domain signal contains energy in a plurality of frequency bins, apply convolutional neural network (CNN) operations on the frequency domain signal, and output a probability for each of the plurality of frequency bins in accordance with the CNN operations, wherein each probability indicates whether the energy in a corresponding frequency bin contains a transmitted signal.

Example fifteen includes the at least one computer readable storage medium of Example fourteen, wherein the instructions, when executed, further cause the computing system to identify one or more noisy frequency bins in the plurality of frequency bins, wherein the noisy frequency bins are associated with probabilities that are below a threshold, suppress the energy in the noisy frequency bins, and perform an inverse DCT on the frequency domain signal to obtain a second digital signal, wherein the second digital signal is to include energy that comprises the transmitted signal and the suppressed energy.

Example sixteen includes the at least one computer readable storage medium of Example fourteen, wherein the instructions, when executed, further cause the computing system to obtain a plurality of one-dimensional (1D) segments from the frequency domain signal, and combine a number of the 1D segments to obtain two-dimensional (2D) input segments, wherein the 2D input segments contain an additional channel dimension.

Example seventeen includes the at least one computer readable storage medium of Example sixteen, wherein the instructions, when executed, further cause the computing system to iteratively perform, on a per network layer basis, a batch normalization operation on the 2D input segments, and wherein the batch normalization operation is to change means and standard deviations of the 2D input segments.

Example eighteen includes the at least one computer readable storage medium of Example seventeen, wherein the instructions, when executed, further cause the computing system to iteratively apply, on the per network layer basis, a nonlinear activation function to an output of the batch normalization operation.

Example nineteen includes the at least one computer readable storage medium of Example eighteen, wherein the instructions, when executed, further cause the computing system to iteratively perform, on the per network layer basis, a 1D convolution operation on an output of the nonlinear activation function, and wherein an output of the 1D convolution operation is to describe intermediate features.

Example twenty includes the at least one computer readable storage medium of Example fourteen, wherein the instructions, when executed, further cause the computing system to bypass a classification of the energy in the plurality of frequency bins.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD (solid state drive)/NAND controller ASICs, and the like. In addition, in some of the drawings, signal conductor lines are represented with lines. Some can be different, to indicate more constituent signal paths, have a number label, to indicate a number of constituent signal paths, and/or have arrows at one or more ends, to indicate primary information flow direction. This, however, should not be construed in a limiting manner. Rather, such added detail can be used in connection with one or more exemplary embodiments to facilitate easier understanding of a circuit. Any represented signal lines, whether or not having additional information, can actually comprise one or more signals that can travel in multiple directions and can be implemented with any suitable type of signal scheme, e.g., digital or analog lines implemented with differential pairs, optical fiber lines, and/or single-ended lines.

Example sizes/models/values/ranges can have been given, although embodiments are not limited to the same. As manufacturing techniques (e.g., photolithography) mature over time, it is expected that devices of smaller size could be manufactured. In addition, well known power/ground connections to IC chips and other components can or can not be shown within the figures, for simplicity of illustration and discussion, and so as not to obscure certain aspects of the embodiments. Further, arrangements can be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
an analog to digital converter to convert a waveform to a first digital signal; and
a processor including logic coupled to one or more substrates, the logic to:
perform a discrete cosine transform (DCT) on the first digital signal to obtain a frequency domain signal, wherein the frequency domain signal contains energy in a plurality of frequency bins,
apply convolutional neural network (CNN) operations on the frequency domain signal,
output a probability for each of the plurality of frequency bins, wherein each probability indicates whether the energy in a corresponding frequency bin contains a transmitted signal,
identify one or more noisy frequency bins in the plurality of frequency bins, wherein the noisy frequency bins are associated with probabilities that are below a threshold,
suppress the energy in the noisy frequency bins, and
perform an inverse DCT on the frequency domain signal to obtain a second digital signal, wherein the second digital signal is to include energy that comprises the transmitted signal and the suppressed energy.

2. The computing system of claim 1, wherein the logic is further to:
obtain a plurality of one-dimensional (1D) segments from the frequency domain signal, and
combine a number of the 1D segments to obtain two-dimensional (2D) input segments, wherein the 2D input segments contain an additional channel dimension.

3. The computing system of claim 2, wherein the logic is further to iteratively perform, on a per network layer basis, a batch normalization operation on the 2D input segments, and wherein the batch normalization operation changes means and standard deviations of the 2D input segments.

4. The computing system of claim 3, wherein the logic is further to iteratively apply, on the per network layer basis, a nonlinear activation function to an output of the batch normalization operation.

5. The computing system of claim 4, wherein the logic is further to iteratively perform, on the per network layer basis, a 1D convolution operation on an output of the nonlinear activation function, and wherein an output of the 1D convolution operation is to describe intermediate features.

6. The computing system of claim 1, wherein the logic is further to bypass a classification of the energy in the plurality of frequency bins.

7. A semiconductor apparatus comprising:
one or more substrates; and
logic coupled to the one or more substrates, wherein the logic is implemented at least partly in one or more of configurable or fixed-functionality hardware, the logic to:
perform a discrete cosine transform (DCT) on a first digital signal to obtain a frequency domain signal, wherein the frequency domain signal contains energy in a plurality of frequency bins;
apply convolutional neural network (CNN) operations on the frequency domain signal;
output a probability for each of the plurality of frequency bins in accordance with the CNN operations, wherein each probability indicates whether the energy in a corresponding frequency bin contains a transmitted signal;
suppress the energy in one or more noisy frequency bins; and
perform an inverse DCT on the frequency domain signal to obtain a second digital signal,
wherein the second digital signal is to include energy that comprises the transmitted signal and the suppressed energy.

8. The semiconductor apparatus of claim 7, wherein the logic is further to:
identify the one or more noisy frequency bins in the plurality of frequency bins,
wherein the noisy frequency bins are associated with probabilities that are below a threshold.

9. The semiconductor apparatus of claim 7, wherein the logic is further to:
obtain a plurality of one-dimensional (1D) segments from the frequency domain signal; and
combine a number of the 1D segments to obtain two-dimensional (2D) input segments, wherein the 2D input segments contain an additional channel dimension.

10. The semiconductor apparatus of claim 9, wherein the logic is further to iteratively perform, on a per network layer basis, a batch normalization operation on the 2D input segments, and wherein the batch normalization operation is to change means and standard deviations of the 2D input segments.

11. The semiconductor apparatus of claim 10, wherein the logic is further to iteratively apply, on the per network layer basis, a nonlinear activation function to an output of the batch normalization operation.

12. The semiconductor apparatus of claim 11, wherein the logic is further to iteratively perform, on the per network layer basis, a 1D convolution operation on an output of the nonlinear activation function, and wherein an output of the 1D convolution operation is to describe intermediate features.

13. The semiconductor apparatus of claim 7, wherein the logic is further to bypass a classification of the energy in the plurality of frequency bins.

14. At least one computer readable storage medium comprising a set of instructions, which when executed by a computing system, cause the computing system to:
perform a discrete cosine transform (DCT) on a first digital signal to obtain a frequency domain signal, wherein the frequency domain signal contains energy in a plurality of frequency bins;
apply convolutional neural network (CNN) operations on the frequency domain signal;
output a probability for each of the plurality of frequency bins in accordance with the CNN operations, wherein each probability indicates whether the energy in a corresponding frequency bin contains a transmitted signal;
suppress the energy in one or more noisy frequency bins; and
perform an inverse DCT on the frequency domain signal to obtain a second digital signal,
wherein the second digital signal is to include energy that comprises the transmitted signal and the suppressed energy.

15. The at least one computer readable storage medium of claim 14, wherein the instructions, when executed, further cause the computing system to:
identify the one or more noisy frequency bins in the plurality of frequency bins, wherein the noisy frequency bins are associated with probabilities that are below a threshold.

16. The at least one computer readable storage medium of claim 14,
wherein the instructions, when executed, further cause the computing system to:
obtain a plurality of one-dimensional (1D) segments from the frequency domain signal; and
combine a number of the 1D segments to obtain two-dimensional (2D) input segments, wherein the 2D input segments contain an additional channel dimension.

17. The at least one computer readable storage medium of claim 16, wherein the instructions, when executed, further cause the computing system to iteratively perform, on a per network layer basis, a batch normalization operation on the 2D input segments, and wherein the batch normalization operation is to change means and standard deviations of the 2D input segments.

18. The at least one computer readable storage medium of claim 17, wherein the instructions, when executed, further cause the computing system to iteratively apply, on the per network layer basis, a nonlinear activation function to an output of the batch normalization operation.

19. The at least one computer readable storage medium of claim 18, wherein the instructions, when executed, further cause the computing system to iteratively perform, on the per network layer basis, a 1D convolution operation on an output of the nonlinear activation function, and wherein an output of the 1D convolution operation is to describe intermediate features.

20. The at least one computer readable storage medium of claim 14, wherein the instructions, when executed, further cause the computing system to bypass a classification of the energy in the plurality of frequency bins.

* * * * *